3,116,973
**METHOD FOR PRODUCING HIGH PURITY
SILICA FROM KAOLIN CLAY**
Walter L. Haden, Jr., Metuchen, N.J., assignor to Minerals & Chemicals Philipp Corporation, a corporation of Maryland
No Drawing. Filed Mar. 6, 1959, Ser. No. 797,599
6 Claims. (Cl. 23—182)

This invention relates to a method for treating kaolin clays to produce finely divided silica of unusually high purity.

There is a commercial need for high purity, fine grained silica which is useful, for example, as an agent for thickening organic liquids, a film "flatting" agent in the coatings field and as a mixture with, or as a support for, catalytic material. In such applications an essentially pure silica is necessary.

Fine grained, high purity silicas have been produced commercially in various ways, such as by precipitation from a solution of alkali silicate by acid, or by hydrolysis of silica halides or organic silicon compounds. Silica produced by these methods is expensive and consequently efforts have been made to obtain finely divided silica of high purity by acid extraction of various minerals.

Kaolin clay, which is abundant in nature and relatively inexpensive, provides a potential source of silica of high purity and, moreover, suggests a source of by-product alumina. Kaolin clays are hydrous aluminosilicates containing as the chief mineral constituent kaolinite, which is represented by the formula $Al_2O_3 \cdot 2SiO_2 \cdot 2H_2O$. The weight ratio of $SiO_2$ to $Al_2O_3$ indicated by this formula is about 1.18:1.0 and kaolin clays normally possess $SiO_2/Al_2O_3$ weight ratios of from 1.0 to 1.5:1. Kaolin clays, however, are not restricted to a clay composed of the single mineral specie kaolinite, but are represented by at least four distinct species; namely, kaolinite, nacrite, anauxite and dickite, all characterized by the formula above given. In addition to alumina and silica, kaolin clays contain ferruginous and titaniferous impurities which are not readily separated from the clays and discolor them to varying degrees.

Prior art efforts to recover a high purity silica from kaolin clay have been more or less unsuccessful in that the resultant silica residue is contaminated with metallic impurities and is too impure for the aforementioned uses, although the silica product has been advocated as a cement aggregate or as a raw material in the preparation of certain zeolitic pigments. Such processes, which generally involve leaching the calcined clay with dilute mineral acid to decompose the clay into a siliceous residue and a soluble essentially aluminous component, are better adapted to the provision of alumina of high purity which is a substitute for the relatively limited and dwindling deposits of bauxite. The silica residues produced by acid leaching of calcined kaolin clay usually have a residual alumina content of at least about 2 percent (and more usually 5 to 10 percent or higher), a titania analysis of about 1 percent or more, and an iron content varying considerably with processing. For use in the aforementioned application, as well as others, the alumina, titania and iron content should be considerably less than that afforded by prior art processes for digesting kaolin clay with mineral acids. While a 5 percent to 10 percent alumina content in a silica product may appear to be a very low value, nevertheless, for use in the aforementioned applications such as alumina content is excessive since the silica product is preferably 98 percent pure, or higher.

Another disadvantage of prior art methods for digesting kaolin clay with mineral acid is that the clay must be calcined prior to acid treatment to realize an effective degree of alumina extraction by the acid. Although basic oxides may be extracted from the silica of other clay types without precalcination, nevertheless, in the case of kaolin clays this is not possible. Calcination, although improving the reactivity of the aluminum in kaolin clay towards acid, is a costly operation and adds considerably to the cost of the ultimate product or products processed thereby. Another signal disadvantage of calcining kaolin clay to render the aluminum therein more reactive towards acid, is that such calcination, unless carefully controlled, can actually result in decreased aluminum reactivity if calcination is too severe since when kaolin is calcined above about 1600° F., new crystalline phases develop, and the acid solubility of the aluminum is markedly diminished.

Accordingly, a principal object of the present invention is to provide a novel process for producing a silica of high purity from kaolin clay, which process obviates the aforementioned difficulties.

Another important object of the present invention is the provision of a method for separating substantially completely the alumina and other metallic constituents from the silica content of kaolin clay so as to obtain a substantially pure silica product.

Another object of the invention is to provide a method for producing high purity silica from kaolin clay by a process which may be carried out simultaneously with a process for recovering the aluminum values from the clay, the process being characterized by an outstanding separation of silica from alumina and other metallic constituents native to the clay.

Other objects and features of the invention will be apparent from the more detailed description given below.

I have discovered a novel process by means of which a high purity silica can be produced simply and economically from kaolin clays. The efficiency of extraction of aluminum, iron and titanium from silica is outstandingly high in the process of the instant invention so that finely divided silica of exceptional purity is recoverable. Alumina may be extracted from the kaolin clay to the extent of 98 percent or 99 percent in the process of my invention, and the $Al_2O_3/SiO_2$ weight ratio of the silica product is ordinarily within the range of from about 1/100 to 1/300. Moreover, the iron and titania contents of the silica product are exceptionally low.

Broadly, my process involves the reaction of uncalcined kaolin clay with concentrated sulfuric acid, in the form of a compact mass thereof, under atmospheric pressure and under time and temperature conditions such as to bring about substantially complete reaction between the aluminum of the clay and the acid. An important feature of the process of my invention is that the nonvolatile portion of the reaction product of the concentrated sulfuric acid with the clay (which is essentially aluminum sulfate) is kept in intimate contact with the siliceous residue of the clay until reaction is completed. Only after reaction is completed are sulfate salts leached or otherwise treated with hot water to dissolve out the resulting soluble sulfate, leaving as a residue the desired high purity essentially metal-free silica product.

The finely divided silica provided by my process is useful as a support for a catalyst, a thickening agent for organic liquids, and as a substitute for synthetic silica gel and diatomaceous earth in many of the applications in which they are used.

The silica provided by my process is of exceptional quality and may be produced in any one of various desired forms.

More specifically, the reaction of crushed uncalcined kaolin clay and sulfuric acid, which is the first phase of my process, can be accomplished by mixing the acid and crushed clay to an appearance of homogeneity in a conventional mixer suitable for this purpose, as for example, a pug mill. The acid and the clay, in the form of a compact mass or masses thereof, are maintained in intimate contact with the nonvolatile reaction products under conditions of time and temperature such that the acid reacts with essentially all of the aluminum of the clay. Hereinafter, the period allowed for further reaction, after mixing, will be referred to as aging.

I prefer to charge to the reactor, degritted raw clay (that which has been refined to the extent that grit, foreign bodies and clots of undispersed clay have been eliminated but have been given no other preliminary treatment) in my process but wish to have it clearly understood that the invention is not limited to the treatment of such a product. Clays which have received other preliminary treatments not entailing appreciable removal of aluminum may still be amenable to processing in accordance with my invention. Examples of preliminary treatment falling within this category are deironing by physical or chemical methods and conventional classifying operations. The clay I employ may be dried, if desired, to remove all or a part of the physically held water or "free moisture" (F.M.), as it is usually called. Free moisture is the weight percentage of the clay eliminated by heating the clay essentially to constant weight at about 250° F. However, drying should be carried out under conditions of time and temperature such that water of crystallization is not eliminated from the clay lattice, such treatment being termed "calcination." I have found that calcination of the clay prior to treatment with the acid, in addition to materially increasing the cost of the process, impairs the efficacy of extraction of iron and titania from the clay under the reaction conditions I employ in my process. The volatile matter content (V.M.) of the starting clay should not be so high as to make for too dilute a mixture of acid and clay for optimum handling and aging conditions. "V.M." refers to the weight percentage of the clay that is eliminated by heating essentially to constant weight at 1800° F. I have found that excellent results are obtainable using a starting clay of about 14 percent V.M. content.

Following are analyses of clays typical of those useful in the practice of my invention.

|  | Kaolinite | Kaolinite | Anauxite | Nacrite | Dickite |
|---|---|---|---|---|---|
| $SiO_2$ | 45.20 | 44.59 | 54.32 | 44.75 | 40.80 |
| $Al_2O_3$ | 37.02 | 36.83 | 29.96 | 39.48 | 35.70 |
| $Fe_2O_3$ | 0.27 | 1.14 | 2.00 | 0.53 | |
| $FeO$ | 0.06 | | | | 0.04 |
| $MgO$ | 0.47 | 0.39 | 0.14 | 0.19 | Trace |
| $CaO$ | 0.52 | 1.02 | 0.32 | 0.13 | 3.96 |
| $K_2O$ | 0.49 | 0.32 | | | 0.20 |
| $Na_2O$ | 0.36 | 0.13 | 0.37 | | 0.20 |
| $TiO_2$ | 1.26 | 2.17 | | | 0.02 |
| $-H_2O$ | 1.55 | | 0.84 | 0.61 | 1.95 |
| $+H_2O$ | 13.27 | 13.63 | 11.80 | 14.40 | 17.68 |
| Total | 100.47 | 100.22 | 99.75 | 100.09 | 100.55 |

In the table "$-H_2O$" indicates free moisture which is determined by heating the clay essentially to constant weight at about 250° F. and measuring the weight loss; "$+H_2O$" indicates combined water which is determined by heating moisture free clay essentially to constant weight at about 1800° F.

An important feature of my invention involves the reaction between kaolin clay and sulfuric acid in the form of a compact mass thereof, thus assuring intimate contact between reactants and nonvolatile reaction products. In other words, no external aqueous phase is associated with the kaolin clay-acid reaction mixture. To realize the provision of such a compact mass both the concentration and quantity of sulfuric acid employed must be controlled. The sulfuric acid in the compact clay-acid masses must be of at least about 62 percent concentration (50° Bé.) and is preferably of 90 percent or higher concentration. I have realized excellent results using the commercially available 66° Bé. acid (about 93 percent $H_2SO_4$). Although I may employ more dilute acids (or add water to a concentrated grade of acid) in the formation of the apparently homogeneous clay-acid mass, nevertheless, during the reaction period the acid must be of the concentration hereinabove specified. Hence, prior to reacting the clay with the acid any such excess water should be driven off until the concentration of the acid in the clay-acid mass is at least about 62 percent concentration. Employing acids less concentrated than about 50° Bé., the reaction between the acid and metallic constituents will not be complete. I employ an acid dosage within the range of from about 150 percent up to about 275 percent, dosages within the range of from about 190 percent to 250 percent being particularly suitable. Acid dosage is defined as the weight of 100 percent acid per unit weight of volatile free clay expressed on a percentage basis. Employing a clay having an $Al_2O_3/SiO_2$ weight ratio of 1:1.18, 135 percent is the acid dosage theoretically required to react completely with the aluminum of the clay. When the acid is employed in a dosage less than about 190 percent, the reaction between the aluminum of the clay and the acid is somewhat less complete than when a 190 percent dosage is employed. When acid dosages greater than about 250 percent are employed, the consistency of the mix is not as suitable for accomplishing the requisite aging as when the dosage is between about 150 percent and about 250 percent. However, dosages up to 300 percent, and in some instances up to 400 percent or higher, may be used in a multistage process in which, for example, the clay is admixed and aged with a 150 percent dosage, leached, and then reacted with a subsequent 150 percent acid dosage.

Aging of the clay-acid mass is carried out between about 300° F. and 1400° F. I have found that optimum temperatures of aging the clay-acid mixture fall within the limits of from about 400° F. to about 1200° F. and optimum times within the range of from 1 to 4 hours. Aging periods in excess of 4 hours may be used if equipment is not unnecessarily tied up thereby. At aging temperatures lower than about 300° F., the reaction between the aluminum of the clay and the acid is incomplete, even after prolonged aging. The mixture may be aged at temperatures as high as about 1400° F., although some undesirable desulfation of the aluminum sulfate may occur with the formation of alumina which is not readily leached from the silica residue. Aging may be carried out in any suitable oven.

Under the reaction conditions within the compass of my invention, the aluminum, titanium and iron sulfates are highly insoluble and the consistency of the clay-acid mix builds up as reaction progresses and the water which is formed is vented off. The aged product is a solid or semisolid mass which is preferably broken up, prior to the ensuing extraction step, into granules, such as, for example, ¼" particles or finer. Crushing is suitably carried out in a jaw crusher, although other apparatus well known for the purpose may be used.

The aged crushed product is leached with hot water near its boiling point, preferably by a countercurrent extraction process, to extract soluble sulfates which will consist primarily of the sulfate of aluminum with smaller amounts of iron and titanium sulfate. A finely divided insoluble silica residue will thus be obtained.

Following is an analysis of siliceous residues obtained under varying conditions of acid dosage and aging temperatures. In all of the runs, the results of which are tabulated in Table I, 96 percent $H_2SO_4$ was used and aging was for about two hours. The clay charge was Klondyke water washed kaolin clay, a sedimentary Georgia clay having the following analysis, V.F. basis: $SiO^2$, 51.84%; $Al_2O_3$, 45.32%; $Fe_2O_3$, 0.40%; Mgo and CaO, not detectable; $Na_2O$, 0.03%; $K_2O$, 0.06%; L.O.I., 14.25%. "L.O.I." represents loss on ignition, which is the weight loss of the material after heating to essentially constant weight at 1800° F.

TABLE I

*Analysis (V.F. Basis) of Siliceous Residue After Leaching Sulfuric Acid Reacted Klondyke Water Washed Kaolin*

| Acid Dosage | Temp., °F. | L.O.I. | $Al_2O_3$ | $TiO_2$ | $Fe_2O_3$ | $SO_3$ |
|---|---|---|---|---|---|---|
| 100 | 400 | 10.17 | 22.64 | 1.44 | 0.21 | 0.90 |
| 130 | 400 | 8.45 | 10.40 | 1.26 | 0.10 | |
| 160 | 400 | 8.97 | 2.69 | 0.67 | 0.05 | |
| 190 | 400 | 9.76 | 1.34 | 0.64 | 0.03 | |
| 220 | 400 | 10.28 | 0.70 | 0.30 | 0.03 | 5.30 |
| 100 | 600 | 9.99 | 27.02 | 1.93 | 0.17 | |
| 130 | 600 | 9.54 | 10.42 | 1.35 | 0.09 | |
| 160 | 600 | 10.03 | 2.24 | 0.60 | 0.03 | |
| 190 | 600 | 11.68 | 0.73 | 0.43 | 0.02 | |
| 220 | 600 | 11.93 | 1.18 | 0.31 | 0.02 | |
| 100 | 800 | 9.32 | 20.74 | 1.81 | 0.15 | |
| 130 | 800 | 8.67 | 10.05 | 1.22 | 0.09 | |
| 160 | 800 | 9.29 | 2.36 | 0.56 | 0.03 | |
| 190 | 800 | 9.69 | 1.22 | 0.28 | 0.02 | |
| 220 | 800 | 10.56 | 0.93 | 0.39 | 0.02 | |
| 100 | 1,000 | 8.53 | 16.43 | 1.96 | 0.15 | 0.63 |
| 130 | 1,000 | 7.71 | 8.91 | 1.21 | 0.08 | |
| 160 | 1,000 | 8.91 | 1.88 | 0.83 | 0.03 | |
| 190 | 1,000 | 8.39 | 0.91 | 0.32 | 0.08 | |
| 220 | 1,000 | 9.39 | 0.79 | 0.57 | 0.03 | 4.07 |

Employing a similar clay, calcined at 1550° F. for 6 hours, prior to treatment with a 160% acid dosage (using 96% concentrated acid) and aging for 2 hours at 400° F., the analysis of the resultant siliceous residue after leaching was: L.O.I., 9.56%; $Al_2O_3$, 1.79%; $TiO_2$, 1.49% and $Fe_2O_3$, 0.09%. Thus, it is apparent that precalcination impaired the efficacy of removal of iron and titania from the silica.

In accordance with an embodiment of our invention, a silica product of enhanced purity is provided by slurrying the silica residue in water and permitting the coarser particle to settle out. The suspended fine fraction has a silica content substantially greater than that of the silica residue prior to sedimentation. An illustration of this embodiment of our invention follows:

A composite of two siliceous residues obtained by reaction of Klondyke water washed kaolin clay with a 190% dosage of 96% acid, aging at 400° F. for 1 hour, 600° F. for 1 hour, and leaching, has the following analysis, V.F. basis:

| | Weight percent |
|---|---|
| L.O.I. | 12.78 |
| $Al_2O_3$ | 0.52 |
| $Fe_2O_3$ | 0.01 |
| $TiO_2$ | 0.17 |
| $SiO_2$ | 99.44 |
| $SO_3$ | 5.83 |

The siliceous residue was slurried with water at about 31% solids and sedimentation carried out by allowing the dispersion to settle for 30 minutes and 2 hours, respectively. The fines remaining in suspension were removed by a siphon, filtered, and dried.

Analysis of the sediment and fines of the composited residues is as follows:

TABLE II

| Analysis | Weight percent | | |
|---|---|---|---|
| | Sediment | Fines After Settling | |
| | | 30 Min. | 2 Hrs. |
| L.O.I. | 10.15 | 17.01 | 12.11 |
| $Al_2O_3$ | 0.92 | 0.34 | 0.17 |
| $Fe_2O_3$ | 0.02 | 0.01 | 0.01 |
| $TiO_2$ | 0.28 | 0.18 | 0.22 |
| $SO_3$ | 5.74 | 5.49 | 5.96 |

The results tabulated in Table II show the outstanding improvement in purity of the silica residue after sedimentation to remove coarse material.

The siliceous filter cake, which will, for example, consist of particles having an average equivalent spherical diameter of about 2 microns, is dried, preferably by spray drying. The product is essentially silica and contains sulfur intimately associated therewith and not extracted by neutral, acid or alkaline medium therefrom. The sulfur content of the silica residue may be readily eliminated, if desired, by calcining the siliceous residue (preferably in a reducing atmosphere, such as in the presence of carbon monoxide or hydrogen gas) at a temperature of the order of 1700° F. for about 1 to 4 hours. However, for many of its intended applications the sulfur, unlike metallic contaminants, will not be detrimental to the utility of the silica product and such calcination may be dispensed with if desired.

The siliceous residue which is provided by the process of this invention is characterized by a surface area usually within the range of 100 to 110 square meters per gram, and typically 103 square meters per gram, as determined by a nitrogen adsorption method described by S. Brunauer, P. H. Emmett and E. Teller in their article entitled "Adsorption of Gases in Multi-Molecular Layers," on page 309 of the Journal of the American Chemical Society, vol. 60, February 1938, using the molecular size data of H. K. Livingston, presented in his article entitled "Cross-Sectional Areas of Molecules Adsorbed on Solid Surfaces," on page 569, Journal of the American Chemical Society, vol. 66, April 1944. The tamped bulk density of the pulverized silica residue will range between about 5–25 lbs. cu. ft., typically 7.8–19.5 lbs./cu. ft.

If a more dense pulverized product is desired the siliceous product may be reacted with a flux at an elevated temperature. This may be accomplished by forming an aqueous slurry of the siliceous filter cake with a flux, typically $Na_2CO_3$, in amount within the range of from about 3 to 7 percent, based on the weight of the siliceous material, spray drying the slurry, and calcining the spray dried product at a temperature in excess of 1700° F., suitably at a temperature of the order of 1800–2000° F. and sufficient to sinter the material. The resulting calcinate is, in effect, a synthetic diatomaceous earth and its physical properties and uses are, in general, that of high grade diatomaceous earth.

As has been hereinabove mentioned, the siliceous residue is effectively separated from the soluble sulfates by a counter-current extraction procedure utilizing water which is close to its boiling point. The sulfate liquor may be used as such for water purification or the aluminum sulfate may be purified by means known to those skilled in the art to obtain alumina of the desired crystalline form, bulk density, etc.

It will be understood that the foregoing detailed examples are illustrative only, for variations and changes may be made in the conditions of the process without departing from the substance of the invention as herein disclosed and defined in the appended claims.

I claim:

1. A process for producing a high purity silica in high yields from kaolin clay comprising forming a homogeneous compact mass of uncalcined kaolin clay and a 150 percent to 275 percent dosage of sulfuric acid in the form of a concentrated aqueous solution of at least about 62 percent concentration, aging said mass while in direct contact with air at atmospheric pressure at a temperature of from about 300° F. to about 1400° F. and for a time sufficient to convert substantially completely the aluminum originally in said clay into an aluminum sulfate reaction product, while maintaining the reactants in intimate contact with the nonvolatile reaction products until such reaction is complete, and leaching the aged mixture with water to dissolve substantially all of the resulting soluble reaction products thereby providing the desired high purity silica as a residue.

2. The process of claim 1 in which said mixture is aged at a temperature of from 400° F. to 1200° F.

3. The process of claim 1 including the steps of mixing said high purity silica residue with from about 3 percent to 7 percent by weight of sodium carbonate and water to form a slurry, subjecting said slurry to spray drying thereby to produce spherical particles and then calcining said particles at a temperature in excess of 1700° F.

4. The process of claim 1 including the step of calcining said silica residue in a reducing atmosphere to reduce the sulfur content of said silica residue.

5. A process for producing in high yields a high purity silica from kaolin clay comprising forming a homogeneous compact mass of uncalcined kaolin clay and a 150 percent to 275 percent dosage of sulfuric acid in the form of a concentrated aqueous solution of at least about 62 percent concentration, aging said mass while in direct contact with air at atmospheric pressure at a temperature of from about 300° F. to about 1400° F. and for a time sufficient to convert substantially all of the aluminum originally in said clay into an aluminum sulfate reaction product while maintaining the reactants in intimate contact with the non-volatile reaction products until said reaction is complete, leaching the aged mixture with water close to its boiling point to dissolve substantially all of the resulting soluble reaction products and leaving finely divided insoluble silica, and mixing said finely divided insoluble silica with water to form a suspension, permitting coarse silica particles to settle out of said suspension, said silica particles which settle out of said suspension being of relatively low purity as compared with the fine silica particles which remain in the aqueous suspension, and removing said aqueous suspension from said particles which have settled out therefrom, thereby producing a high purity silica product in aqueous suspension.

6. A process for producing high purity silica from kaolin clay comprising forming a homogeneous compact mass of uncalcined kaolin clay and a 190 percent to 250 percent dosage of sulfuric acid in the form of a concentrated aqueous solution of at least about 62 percent concentration, aging said mass while in direct contact with air at atmospheric pressure at a temperature within the range of from 400° F. to 1200° F. for 1 to 4 hours so as to convert substantially all of the aluminum originally in said clay into an aluminum sulfate reaction product while maintaining the reactants in intimate contact with the nonvolatile reaction products until said reaction is complete, leaching the aged mixture with water close to its boiling point to dissolve substantially all of the resulting reaction products thereby providing the desired high purity silica as a residue, and calcining said residue in a reducing atmosphere to reduce the sulfur content thereof.

References Cited in the file of this patent

UNITED STATES PATENTS

| | | |
|---|---|---|
| 191,160 | Lennig | May 22, 1877 |
| 752,927 | Schwahn | Feb. 23, 1904 |
| 1,739,734 | Raine et al. | Dec. 17, 1929 |
| 1,843,576 | McClure et al. | Feb. 2, 1932 |
| 1,898,774 | Guthrie et al. | Feb. 21, 1933 |
| 1,932,832 | Turrentine | Oct. 31, 1933 |
| 1,973,211 | Kirkham | Sept. 11, 1934 |
| 1,983,271 | Earle | Dec. 4, 1934 |
| 2,010,655 | Wollner et al. | Aug. 6, 1935 |
| 2,023,278 | McGregor et al. | Dec. 3, 1935 |
| 2,879,136 | Maloney | Mar. 24, 1959 |
| 2,904,520 | Donovan et al. | Sept. 15, 1959 |
| 2,925,393 | Gary | Feb. 16, 1960 |
| 2,934,428 | Donaldson et al. | Apr. 26, 1960 |
| 2,960,478 | Robinson | Nov. 15, 1960 |
| 2,967,157 | Robinson et al. | Jan. 3, 1961 |
| 2,988,519 | Robinson (2) | June 13, 1961 |
| 3,016,355 | Robinson et al. | Jan. 9, 1962 |

OTHER REFERENCES

Mellor: "Comprehensive Treatise on Inorganic and Theoretical Chemistry," vol. 6, 1925, pp. 237–238.

UNITED STATES PATENT OFFICE
CERTIFICATE OF CORRECTION

Patent No. 3,116,973                 January 7, 1964

Walter L. Haden, Jr.

It is hereby certified that error appears in the above numbered patent requiring correction and that the said Letters Patent should read as corrected below.

Column 1, line 67, for "as" read -- an --; column 4, line 70, for "$SiO^2$" read -- $SiO_2$ --.

Signed and sealed this 2nd day of June 1964.

(SEAL)
Attest:

ERNEST W. SWIDER                           EDWARD J. BRENNER
Attesting Officer                              Commissioner of Patents